March 8, 1955 M. MASSAROTTI 2,703,496
AUTOMATIC DEVICE FOR SELECTIVE OPERATION OF CHANGE
SPEED GEARS, PARTICULARLY FOR MOTOR CARS
Filed Jan. 22, 1951 2 Sheets-Sheet 2
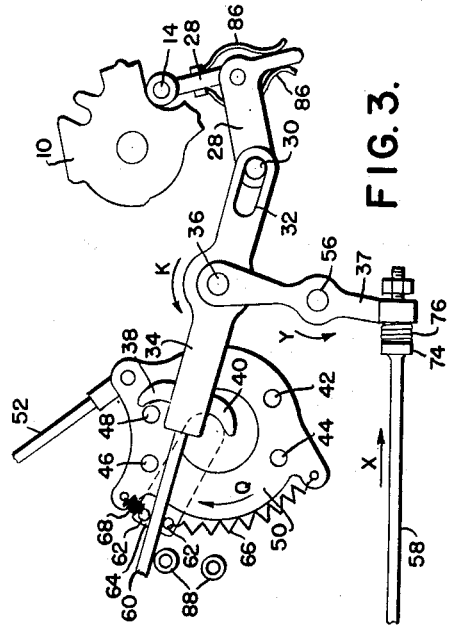
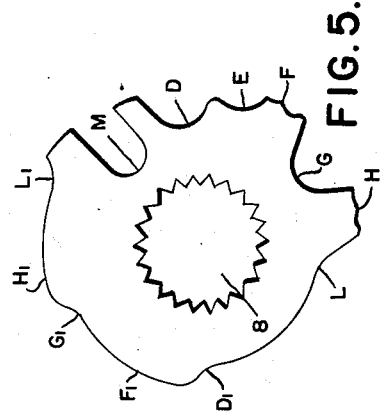
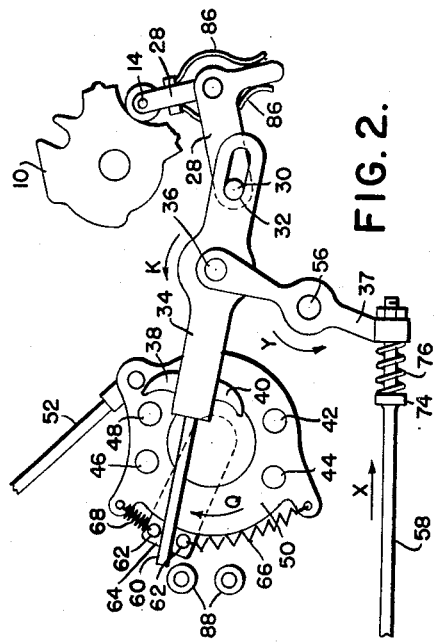
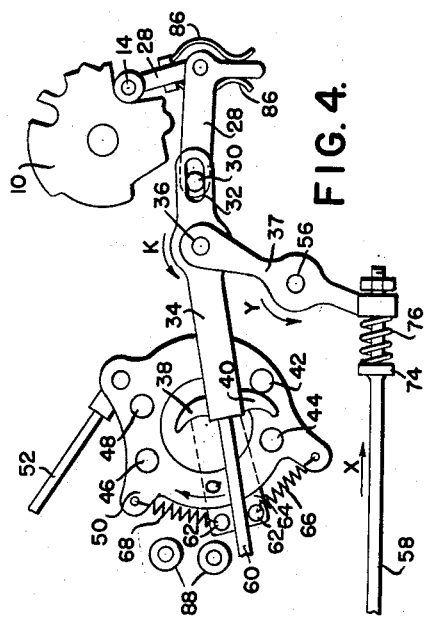
INVENTOR
Mario Massarotti United States Patent Office 2,703,496
Patented Mar. 8, 1955

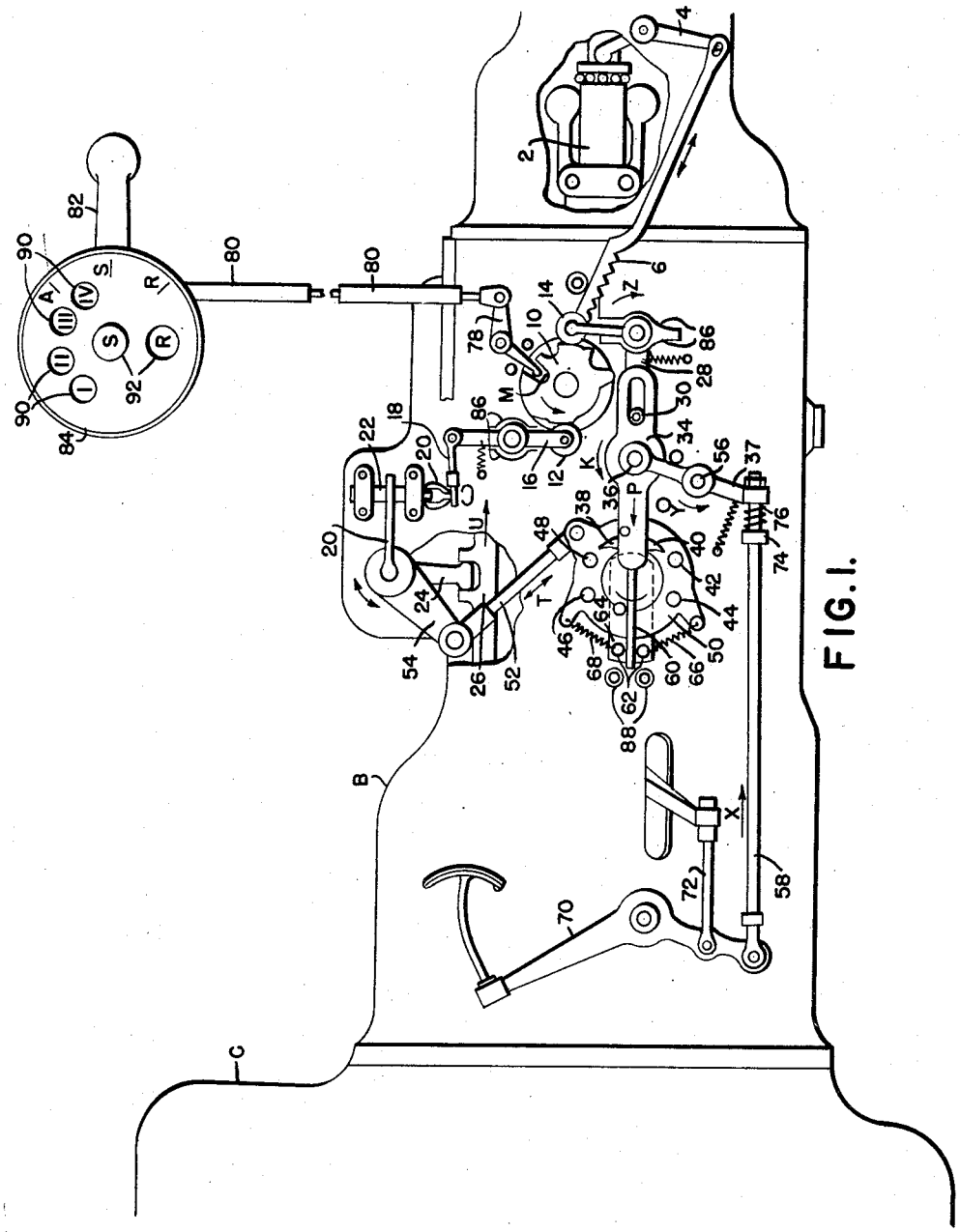

2,703,496

AUTOMATIC DEVICE FOR SELECTIVE OPERATION OF CHANGE SPEED GEARS, PARTICULARLY FOR MOTOR CARS

Mario Massarotti, Pavia, Italy

Application January 22, 1951, Serial No. 207,184

Claims priority, application Italy January 23, 1950

8 Claims. (Cl. 74—336.5)

This invention relates to an automatic device for selective operation of change speed gears, particularly for motor vehicles.

It is an object of the present invention to provide means facilitating the automatic shifting of the gearing of a vehicle transmission in accordance with the vehicle speed.

It is another object of the present invention to provide means of the aforesaid character permitting a change in speed by directly shifting from a low speed to a high speed without passing through an intermediate speed.

It is a further object of the present invention to provide means manually or automatically actuable to effect a change of speeds for an automatic vehicle.

The above and still further objects of the present invention will become apparent upon consulting the following detailed description of the invention taken in conjunction with the drawings, wherein:

Fig. 1 shows diagrammatically an embodiment of device constructed according to the invention, designed particularly for motor vehicles, and Figs. 2, 3 and 4 show a detail of said device, respectively in the pre-setting position for the second speed, in the throwing-in position for the second speed and in the automatic pre-setting for the free-wheel position.

Fig. 5 shows the pre-setting cam forming a part of the present device.

Referring to drawings, the reference numeral 2 designates a centrifugal governor controlled by the revolving elements of a car transmission. The governor 2 acts, through the lever 4, on rack 6. Axial motion of the racks 6 causes a rotation of gear 8 which is keyed on the shaft of pre-setting cam 10. Thus, when the speed of car is increased, the cam 10 is caused to rotate in the counterclockwise direction conversely, when the car speed is decreased, the cam 10 is rotated in clockwise direction.

The cam 10 acts on two diametrally opposed rollers 12 and 14. Roller 12 is fitted loose on one end of swinging lever 16 by which is controlled through the connecting rod 18 an angle lever 20, the latter being pivotable around the vertical pivot 22. By the angle lever 20, the projection or feather 24 is transversally moved for engagement with one of a plurality of axially moving rods 26. The rods 26 are provided in a known manner with the change gear B, and carry the forks by means of which the various pair of gears are thrown in and out. Roller 14 is fitted on one end of the bell crank or angle lever 28, the opposite end of which is provided with the pin 30, the pin being embracingly received within longitudinal slot 32 of shifting element 34 by which the rods 26 are controlled. The shifting element 34, is pivoted at one intermediate point such as 36, to lever 37 by which, as will be hereinafter explained, the proper shifting action is performed. The element 34 comprises a metal plate having two opposite abutments or feathers 38 and 40, designed to bear against one or on the other of the four pins 42, 44, 46 and 48, carried by disc 50, the latter being rotatable about its own axis. On disc 50 is pivoted the connecting rod 52, which acts on crank 54, for causing the projection or feather 24 to be swung in a plane parallel to that of the drawing, whereby the rods 26 are axially moved, and the various gears of change speed gear are thrown in. Lever 37 is pivoted at one intermediate point, such as 56, to a pivot fixed to the body of the device. The opposite end of lever 37 is connected to rod 58, which eventually effects the axial motion of the change gear rods 26. The shifting element 34 is provided with an axial rod 60 that is guided between two rollers 62 fitted on the plate 64, which can be freely swung around the rotation axis of disc 50. The disc 50 is connected to said plate 64 by means of two springs 66 and 68, in such a manner that the equilibrium position of both elements is the middle position shown by Fig. 1.

The shifting rod 58 can also be hand-operated each time that a pair of gears of the change gear is to be thrown in, or out. The rod 58 is preferably connected to clutch control lever 70, whereby with only one actuation the motor shaft C is first disengaged from the change gear primary shaft by any known means such as by driving apart of friction surfaces by a push rod 72, and then the corresponding pair of gears of the change gear is thrown in, or out. Then, by releasing the clutch pedal, the motor will be again connected to the change gear. The drive is transmitted to car wheels provided that one pair of wheels of change gear is in working position, that is, when it is not in the free-wheel position. In order to sequentially obtain the throwing out of clutch, and then the engagement or disengagement of a pair of wheels of the change gears, the rod 58 is not rigidly connected to lever 37. The connection is instead established in such a manner as to permit the rod 58 to be moved in the direction of arrow X, with a stroke sufficient to cause the clutch to be thrown out before the lever 37 can be swung in the direction of arrow X by the stop 74 which is fitted on said rod 58. The rod is brought in its reciprocal rest position, with respect to lever 37 after the pedal 70 has been released, by the action of spiral spring 76. The spring 76, which has been loaded in the preceding step of operation, and now tends to drive the stop 74 away from end of lever 37. The cam 10 is shaped in such a manner as to permit, in the present example of a change gear with four forward speeds and one reverse, six positions for the lever 28, and one position for lever 16. In Fig. 5, D is the reverse speed position for lever 28, to which corresponds the position $D_1$ of lever 16; E is the neutral position of lever 28; F is the lowest speed position, to which corresponds the position $F_1$ of lever 16. Similarly, G—$G_1$ and L—$L_1$ are respectively the positions of the two intermediate, and of the highest forward speed. All the aforesaid positions are diametrally opposed in pairs, since the rollers 12 and 14 of present embodiment are fitted in diametrally opposite directions. It will obviously be understood that the cam profile shall depend upon the design features of change speed gear to which the automatic device for selective operation is to be fitted. Cam 10 is provided with a notch M which embracingly receives one end of lever 78, the latter being swivelled by means of a transmission 80, preferably of the Bowden cable type, from a control lever 82 located within easy reach of the car driver. By actuating on lever 82, cam 10 can be rotated independently of the action exerted by the governor 2. The lever 82, and thus the cam 10, can be brought into the three positions A, S, and R marked on dial 84, and to which correspond the three positions of cam 10 on rollers 12 and 14 which are marked respectively with $DD_1$, E and $FF_1$.

When the lever 82 is in position S, both levers 17 and 28 are in the position shown by Fig. 1, that is with their neutral position in respect to shifting element 34. Accordingly even when the pedal 70 is depressed, none of the pins on disc 50 will be actuated by abutments or feathers 38 and 40, whereby no engagement or disengagement of change speed gear is caused.

In such a condition, the change gear is in its free wheel position.

By shifting the lever 82 into position A, the lever 16 is moved by the cam 10 into a position wherein the projection or feather 24 is brought in correspondence with the rod 26 which carries the fork for throwing-in the lowest speed. Simultaneously, the roller 14 is brought from neutral position E to position F, whereby the lever 28 is rotated in the direction of arrow Z, thus causing the shifting element 34 to rotate about the pivot 36 in the direction of arrow K. At this time the abutment or feather 40 confronts and engages the pin 42, upon depressing the pedal 70, after having thrown out the clutch by means of rod 72, the lever 37 swings in the direction of arrow Y, and thereby the shifting element 34 is moved in the direction of the arrow P. Due to the engagement of abutment 40 against pin 42, the disc 50 is rotated in the direction of the arrow Q and the rod 52 is moved in the direction of arrow T. Finally the rod 26 is moved in the direction of the arrow U, whereby the lowest speed gears are brought into mesh by the special displacement of the appropriate rod 26.

Upon releasing the pedal 70, the clutch is thrown in, and thus the drive will be transmitted to car wheels through the selected pair of gears for the lowest speed. As the car speed is increased, the governor 2 comes into action and cam 10 is rotated in counterclockwise direction. After the car has reached a high speed sufficiently high enough for throwing in of the second speed, the rollers 12 and 14 are respectively in the positions G and $G_1$ (Fig. 5) which correspond to presetting of second the speed. It should be noted that, after the pedal has been released, rod 58 is moved in a direction opposite to that of arrow X, lever 37 is swung in a direction opposite to that of arrow Y, and the shifting element 34 is moved in a direction opposite to that of arrow P, to reach their original positions with respect to point 36 only but not with respect to orientation. The latter fact is evident since the plate 64, which tends to reach its middle position with respect to pins 42, 44, 46, 48, causes the rod 60 to be brought upwards together with the shifting element 34, and abutment or feather 38 is brought into confronting relation with pin 46 which, during the preceding rotation in the direction of arrow Q, had taken the place of pin 48. This is precisely the automatic pre-setting of free-wheel position since, by again depressing pedal 70, the disc 50, due to engagement of abutment 38 with the pin 46, is caused to rotate in a direction opposite to that of arrow Q, thus bringing the pair of gears for the lowest speed out of meshing engagement, and restoring the original free-wheel condition as shown by Fig. 1.

Now, similarly to what has already been stated with respect to the pre-setting of the first speed, the pair of gears of second speed are brought into operation by actuating the lever 70.

As the speed of car is accelerated, the cam 10 is successively brought into the pre-setting position for the third speed (H—$H_1$) and for the fourth speed (L—$L_1$). A double action is to be exerted each time on pedal 70, first, to bring the change gear back in its free-wheel position; and, second, to throw-in the speed that has been pre-set by the cam. Then, it will be apparent that, in case of a sudden deceleration of the car due, for example to a braking action, the change gear can be directly shifted from fourth to first or second speed, passing through the free-wheel position. It will also be possible to shift directly from a lower speed (i. e. the second speed) to a higher speed, without passing through the intermediate speed (i. e. directly to fourth speed). For such an operation, it will be sufficient to leave out the double action on pedal 70 after the third speed has been pre-set, awaiting until the fourth speed pre-set position has been reached by the cam. Obviously, all this is possible only when the characteristics of the engine are such as to allow the engine to endure the abnormal temporary condition.

In order to permit the free movements described for the various kinematic engaging and disengaging devices, irrespective of motion of cam 10, the levers 16 and 28 are universally jointed in correspondence of their fulcrum, and their shape is established by the equilibrium position of side leaf springs 86, secured to one section of said levers, and by which a pressure is exerted on the other section of same levers.

To better explain the operation of shifting element 34 and of plate 64, there is shown in Figs. 2, 3 and 4 the various positions taken by the kinematic engaging and disengaging elements for the third speed (position G—$G_1$ of cam 10) respectively in the steps of pre-setting, throwing-in, and return with automatic pre-setting of free-wheel position. In Fig. 2 it can be noticed that, as an effect of a pre-setting of second speed, the shifting element 34 is caused to rotate around the pivot 36 in a direction opposite to that of arrow K, whereby the plate 64 is moved upwards, thus loading in opposite directions the two springs 66 and 68.

By acting on rod 58 (see Fig. 2) in the direction of arrow X, the abutment or feather 38 will act on pin 48, whereby the disc 51 is caused to rotate in a direction opposite to that of arrow Q, thus throwing in through the rod 52, the gears of second speed.

During such an operation, the orientation of rod 60 is kept unchanged in respect to plate 64 by the action of upper supporting roller 88 (the lower roller will exert a supporting action only when the shifting element is rotated in the direction of arrow K). By releasing the clutch pedal, the shifting element 34 is brought back and rod 60 is lifted from roller 88. Then the plate 64, under the action of springs 66 and 68, will be brought into its middle equilibrium position in respect to pins 42, 44, 46 and 48 and during such a movement it also drives the shifting element 34, thus being brought into confronting relation with pin 44 (see Fig. 4). In such a manner, the automatic pre-setting of free-wheel position can be obtained. More specifically, such a position is obtained by simply acting on clutch pedal so as to cause, due to engagement of abutment 40 with pin 44, the disc 50 to rotate in the direction of arrow Q whereby the disc, while bringing out of mesh gears of second speed, is returned in its original position.

By again releasing the clutch pedal, the shifting element is brought back in its operating position for a further throwing-in of speed (i. e. the speed corresponding to pre-setting established in the meantime by the governor).

From the aforesaid, it will be apparent that the throwing-in action is exerted by the pins 42 and 48, while the pins 44 and 46 will provide for the throwing-out and the automatic presetting of free-wheel position.

Signal lamps can be fitted on instrument panel 80, in order to inform the car driver of the exact positions taken at each time by the various change speed gear elements, as well as the positions of pre-setting device. The signal lamps 90 correspond to the four speeds; suitable switches, inserted into the lamp circuits, are controlled by the throwing-in devices of change speed gear, so that at each time it will be lighted only the lamp corresponding to the particular speed is in mesh. At the same time, a second system of signal lamps can also be provided having lights of different colors, or having intermittently operated lights which shall be controlled by the automatic means for selective operation; in such a manner the car driver is constantly advised as to what speed has been pre-set, and thus of the necessity of performing the shifting action.

The signal lamps S and R correspond to free-wheel and reverse speed positions, latter position being obtained manually by bringing lever 82 on mark R, whereby cam 10 is brought into positions D—$D_1$, corresponding to reverse speed pre-setting.

It will be apparent that the characteristics of device can be modified by altering the adjustment of governor, that is by causing the pre-setting changeover to be effected at speeds different from those covered by the original adjustment. At times, it might be advantageous to obtain such a change when the car is running, that is, when due to peculiar traffic conditions, requiring quick accelerations, overtaking of other cars, etc., unusually severe, but temporary performances are to be required from the engine. Then, it will be sufficient to provide, within easy reach of car driver, an element by which the governor adjustment can be varied at will (i. e. by varying the preloading of centrifugal governor springs).

The throwing-in and out of change gear which, in the aforedescribed example are obtained by means of the shifting lever, could obviously be made also automatic, by simply providing the device with a mechanical, hydraulic or electric control by which the lever 37 (or directly the lever 70) can be actuated, and that is automatically put into action by the speed pre-setting device.

It can thus be seen that in accordance with the present invention there has been provided a vehicle including gear transmission mechanism having a plurality of gear controlling rods and clutch means, and driving means; and further including controlling means responsive to the operation of said driving means for actuating said gear transmission mechanism, first means for selectively engaging one of said gear controlling rods, second means connected to said controlling means and to said clutch means for displacing said one of said gear controlling rods when said clutch means is disengaged, whereby the selective actuation of said gear transmission mechanism is controlled by said driving means.

Although only one specific embodiment of the invention has been described and shown in the drawing, it should be noted that the invention may be realized in modified form and adaptations of the arrangement herein disclosed may be made as may readily occur to persons skilled in the art without constituting a departure from the spirit and scope of the invention as defined in the objects and in the appended claims.

I claim:

1. In a vehicle including gear transmission mechanism having a plurality of gear controlling rods and clutch means, and driving means; controlling means for operating said transmission mechanism in relation to the power output of said driving means and cooperable with said clutch means, cam means for controlling the operation of said gear transmission mechanism, first lever means displaced by said cam means in order to selectively engage one of said gear controlling rods, second lever means operatively connected to said cam means for displacing said one of said gear controlling rods, first connecting means joining said second lever means to said clutch means and second connecting means joining said second lever means to said controlling means, whereby said gear transmission mechanism is operated in relation to the power output of said driving means.

2. In a vehicle according to claim 1, said second lever means including disc means having opposite projections, a first lever pivoted to said disc means and a second lever including means selectively engageable with one of said projections, whereby said disc means is angularly displaced by said second lever to thereby move said first lever and to thereby displace said one of said gear controlling rods.

3. In a vehicle including gear transmission mechanism having a plurality of gear controlling rods and clutch means, and driving means; controlling means responsive to the operation of said driving means for actuating said gear transmission mechanism, first means for selectively engaging one of said gear controlling rods, second means connected to said controlling means and to said clutch means for displacing said one of said gear controlling rods when said clutch means is disengaged, whereby the selective actuation of said gear transmission mechanism is controlled by said driving means.

4. In a vehicle according to claim 3, wherein said first means includes first lever means selectively engageable with said one of said gear controlling rods, and said second means includes second lever means, third lever means, and coupling means between said second lever means and said third lever means, connecting means joining said second lever means to said clutch means and to said controlling means, and said third lever means being connected to said first means to thereby displace said one of said gear controlling rods engaged by said first lever means.

5. In a vehicle including transmission mechanism having a plurality of sets of gear elements each including a plurality of gears adapted to be connected, and driving means; control means including mechanism responsive to the operation of said driving means, cam means actuated by said mechanism, first means operatively connected to said cam means for contacting one of said sets of gears, and second means operatively connected to said cam means for displacing said one of said sets of gear elements contacted by said first means and thereby connecting said gears included in said last mentioned set of gear elements, whereby said transmission mechanism is coupled to said driving means.

6. In a vehicle according to claim 5; signalling means operatively connected to said cam means for indicating which set of gears of said transmission mechanism is coupled to said driving means.

7. In a vehicle according to claim 5, said control means including lever means for positioning said cam means in predetermined relation with said mechanism, whereby control of the direction of motion of said vehicle is obtained.

8. In a vehicle according to claim 5, said second means including a shifting lever actuated by the operator of the vehicle for operating said transmission mechanism.

References Cited in the file of this patent

UNITED STATES PATENTS

| | | |
|---|---|---|
| Re. 20,253 | Richter | Jan. 26, 1937 |
| 1,771,431 | Cartwright | July 29, 1930 |
| 1,959,476 | Janik | May 22, 1934 |
| 2,175,012 | Avonde et al. | Oct. 3, 1939 |
| 2,193,432 | Randol | Mar. 12, 1940 |
| 2,219,323 | Kliesrath | Oct. 29, 1940 |
| 2,381,805 | Buck | Aug. 7, 1945 |
| 2,386,174 | Randol | Oct. 2, 1945 |